US008459421B2

(12) United States Patent
Tsujimi et al.

(10) Patent No.: US 8,459,421 B2
(45) Date of Patent: Jun. 11, 2013

(54) DISK BRAKE AND SLIDING MEMBER

(75) Inventors: Shintaro Tsujimi, Kawasaki (JP); Kiyokazu Nakane, Ohi-machi (JP)

(73) Assignee: Hitachi Automotive Systems, Ltd., Kanagawa (JP)

( * ) Notice: Subject to any disclaimer, the term of this patent is extended or adjusted under 35 U.S.C. 154(b) by 414 days.

(21) Appl. No.: 12/659,145

(22) Filed: Feb. 26, 2010

(65) Prior Publication Data

US 2010/0219027 A1    Sep. 2, 2010

(30) Foreign Application Priority Data

Feb. 27, 2009 (JP) ................................. 2009-047263
Jan. 27, 2010 (JP) ................................. 2010-015650

(51) Int. Cl.
*B60T 11/00* (2006.01)
*B32B 9/00* (2006.01)

(52) U.S. Cl.
USPC ........................................ 188/370; 428/472.2

(58) Field of Classification Search
USPC .............. 188/72.1, 370; 428/472.2, 651, 666, 428/629; 205/172, 178, 201
See application file for complete search history.

(56) References Cited

U.S. PATENT DOCUMENTS

| | | | |
|---|---|---|---|
| 4,166,776 A | 9/1979 | Lefebvre et al. | |
| 4,421,612 A | 12/1983 | Videm | |
| 4,861,440 A * | 8/1989 | Covino | 205/112 |
| 5,304,257 A | 4/1994 | Pearlstein et al. | |
| 6,311,806 B1 | 11/2001 | Gonzalez et al. | |
| 2005/0109429 A1 * | 5/2005 | Okamoto et al. | 148/440 |
| 2006/0055084 A1 * | 3/2006 | Yamaguchi et al. | 264/328.16 |
| 2006/0191599 A1 | 8/2006 | Matzdorf et al. | |
| 2009/0016662 A1 * | 1/2009 | Ohtsuki et al. | 384/544 |
| 2010/0147762 A1 * | 6/2010 | Zhang et al. | 210/490 |

FOREIGN PATENT DOCUMENTS

| | | | |
|---|---|---|---|
| EP | 0423832 | * | 4/1991 |
| JP | S53-058443 A | | 5/1978 |
| JP | H03-100198 A | | 4/1991 |
| JP | 2002-169316 A | | 6/2002 |
| JP | 2004-044791 A | | 2/2004 |
| JP | 2006-089788 A | | 4/2006 |
| JP | 2006-188767 A | | 7/2006 |
| JP | 2006-292119 A | | 10/2006 |

OTHER PUBLICATIONS

European Search Report, App. No. EP 10 15 5021, Apr. 30, 2010 (4 pages).
Notification of Reasons for Refusal issued in Japanese Patent Application No. 2010-015650, dated Jan. 16, 2013.

* cited by examiner

*Primary Examiner* — Bradley King
*Assistant Examiner* — Vishal Sahni
(74) *Attorney, Agent, or Firm* — Rader, Fishman & Grauer PLLC

(57) ABSTRACT

There is provided a disk brake comprising: a piston that presses a brake pad to a disk rotor; and a caliper at which the piston is slidably provided through a piston seal, the caliper making the piston moved forward by hydraulic pressure, wherein the piston has that an anodized film layer formed by an anodized treatment is formed on a surface of a piston base body made of aluminum alloy, and a chromium plating layer is directly laminated on a surface of the anodized film layer.

19 Claims, 15 Drawing Sheets

FIG. 5

| No. | Anodized treatment conditions | | | | Chromium plating conditions | | | |
|---|---|---|---|---|---|---|---|---|
| | Bath composition | Bath temperature (°C) | Current density (A/dm²) | Treatment time (min) | Bath composition | Bath temperature (°C) | Current density (A/dm²) | Treatment time (min) |
| 1 | 30% Sulfuric acid | 20 | 3.0 | 5 | HEEF25 | 60 | 40 | 30 |
| 2 | 30% Phosphoric acid | 30 | 3.0 | 5 | | | | |
| 3 | 10% Chromic acid | 60 | 1.0 | 5 | | | | |
| 4 | 10% Chromic acid | 60 | 2.0 | 5 | | | | |
| 5 | 10% Oxalic acid | 40 | 2.0 | 5 | | | | |

| No. | Anodized conditions | | | | |
|---|---|---|---|---|---|
| | Bath composition | Bath temperature (°C) | Current density (A/dm²) | Electrolysis time (min) | Final voltage (V) |
| 6 | 20% Sulfuric acid | 20 | 3.0 | 5 | 14.0 |
| 7 | 36% Phosphoric acid | 30 | 2.0 | 5 | 33.3 |
| 8 | 10% Chromic acid | 40 | 2.0 | 5 | 21.1 |

FIG. 10

| No. | Anodized treatment conditions | | | | Chromium plating conditions | | | |
|---|---|---|---|---|---|---|---|---|
| | Bath composition | Bath temperature (°C) | Current density (A/dm²) | Treatment time (min) | Bath composition | Bath temperature (°C) | Current density (A/dm²) | Treatment time (min) |
| 9 | 30% Phosphoric acid | 30 | 3.0 | 5 | HEEF25 | 60 | 40 | 30 |
| 10 | | | | 10 | | | | |
| 11 | | | | 20 | | | | |

FIG. 12

| | Measuring portions | Material (mm) | Posterior to chromium plating (mm) | Variation quantities (μm) |
|---|---|---|---|---|
| 9-1 | X-X' | 30.150 | 30.181 | 31 |
| | Y-Y' | 30.147 | 30.179 | 32 |
| 9-2 | X-X' | 30.151 | 30.176 | 25 |
| | Y-Y' | 30.148 | 30.175 | 27 |
| | | | Average variation quantities | 29 |
| 10-1 | X-X' | 30.149 | 30.174 | 25 |
| | Y-Y' | 30.148 | 30.176 | 28 |
| 10-2 | X-X' | 30.152 | 30.174 | 22 |
| | Y-Y' | 30.150 | 30.176 | 26 |
| | | | Average variation quantities | 25 |
| 11-1 | X-X' | 30.147 | 30.163 | 16 |
| | Y-Y' | 30.151 | 30.163 | 12 |
| 11-1 | X-X' | 30.147 | 30.166 | 19 |
| | Y-Y' | 30.147 | 30.164 | 17 |
| | | | Average variation quantities | 16 |

FIG. 13

(Unit: μm)

| Measuring portions | | X | X' | Y | Y' | Average |
|---|---|---|---|---|---|---|
| 9 | R portion | 28.6 | 31.1 | 24.3 | 25.7 | 27.4 |
| | Central portion | 15.0 | 14.3 | 13.9 | 13.2 | 14.1 |
| | End portion | 37.5 | 39.3 | 35.7 | 39.3 | 38.0 |
| 10 | R portion | 30.7 | 29.2 | 27.5 | 28.6 | 29.0 |
| | Central portion | 16.8 | 15.4 | 14.8 | 14.3 | 15.3 |
| | End portion | 43.9 | 41.1 | 40.4 | 44.6 | 42.5 |
| 11 | R portion | 33.9 | 32.1 | 32.8 | 30.4 | 32.3 |
| | Central portion | 16.1 | 16.8 | 15.7 | 15.7 | 16.1 |
| | End portion | 47.1 | 46.4 | 51.1 | 43.6 | 47.1 |

※ Since the boundary defined between anodized film layer and chromium plating layer is not clear, a film thickness combined these layers is calculated

FIG. 14

| Anodized treatment | Electrolytic solution | Phosphoric-acid 100g/ℓ |
|---|---|---|
| | Current density | 3A/dm² |
| | Electrolytic time | 5 min |
| | Bath temperature | 10~60°C |
| Chromium plating treatment | Plating solution | Organo-sulfonic-acid bath |
| | Bath temperature | 60°C |
| | Current density | 40A/dm² |
| | Electrolytic time | 60 min |

FIG. 15

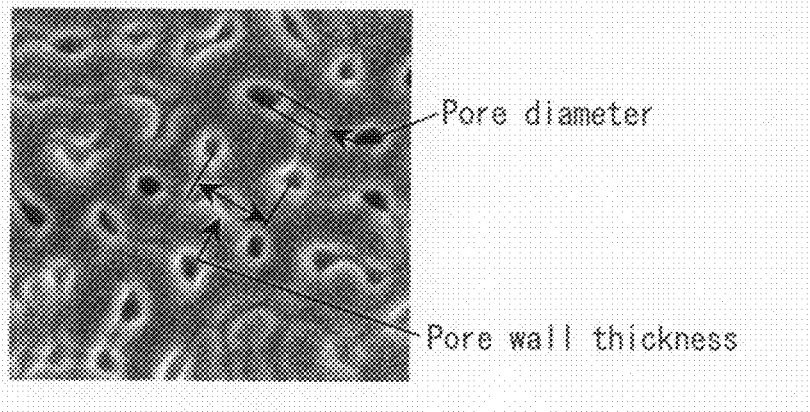

Pore diameter

Pore wall thickness

FIG. 16

| Anodized treatment conditions | Surface condition of anodized film layer | Pore properties | Chromium plating adhesiveness |
|---|---|---|---|
| Phosphoric-acid concentration 100g/ℓ at bath temperature 10°C | | Pore diameter: 19~25nm<br><br>Pore wall thickness: 192~423nm<br><br>Pore density: 7~14 pieces/μm² | Non-accepted |
| Phosphoric-acid concentration 100g/ℓ at bath temperature 20°C | | Pore diameter: 77~238nm<br><br>Pore wall thickness: 23~114nm<br><br>Pore density: 29~70 pieces/μm² | Accepted |
| Phosphoric-acid concentration 100g/ℓ at bath temperature 40°C | | Pore diameter: 39~153nm<br><br>Pore wall thickness: 30~77nm<br><br>Pore density: 51~64 pieces/μm² | Accepted |
| Phosphoric-acid concentration 100g/ℓ at bath temperature 50°C | | Pore diameter: 39~77nm<br><br>Pore wall thickness: 9~39nm<br><br>Pore density: 60~96 pieces/μm² | Accepted |
| Phosphoric-acid concentration 100g/ℓ at bath temperature 60°C | | Pore diameter Non-measurable<br><br>Pore wall thickness: Non-measurable<br><br>Pore density Non-measurable | Non-accepted |

| Anodized treatment | Electrolytic solution | Phosphoric-acid 50~200g/ℓ |
|---|---|---|
| | Current density | 3A/dm² |
| | Electrolytic time | 5 min |
| | Bath temperature | 10~60°C |
| Chromium plating treatment | Plating solution | Organo-sulfonic-acid bath |
| | Bath temperature | 60°C |
| | Current density | 40A/dm² |
| | Electrolytic time | 60 min |

FIG. 19

| | | Phosphoric-acid concentration(g/ℓ) | | | |
|---|---|---|---|---|---|
| | | 50 | 100 | 150 | 200 |
| Bath temperature (°C) | 60 | 2.05 | 4.51 | | |
| | 50 | 1.58 | 2.00 | 2.25 | 3.82 |
| | 40 | 1.30 | 1.47 | 1.78 | 1.81 |
| | 30 | 0.89 | 1.07 | 1.22 | 0.99 |
| | 20 | 0.60 | 0.97 | 1.04 | 0.97 |
| | 10 | 0.58 | 0.71 | 0.75 | 0.80 |

FIG. 20

| Base material | | A6061 |
|---|---|---|
| Anodized treatment | Electrolytic solution | Phosphoric-acid 50~300g/ℓ |
| | Bath temperature | 30°C |
| | Current density | 3A/dm² |
| | Electrolytic time | 5 min |
| Chromium plating treatment | Plating solution | Organo-sulfonic-acid bath |
| | Bath temperature | 60°C |
| | Current density | 40A/dm² |
| | Treatment time | 60 min |

DISK BRAKE AND SLIDING MEMBER

BACKGROUND OF THE INVENTION

1. Field of the Invention

The present invention relates to a disk brake and a sliding member.

2. Description of the Related Art

In a piston for a disk brake that is the example of a sliding member in which to be slidably moved in a cylinder, it is known that a chromium plating layer is formed on the sliding surface so as to minimize sliding resistance between the piston and a piston seal. Due to the formation of the chromium plating layer, brake feeling can be improved. See, for example, a Japanese Patent Application Laid-open No. 2006-292119 (hereinafter to be referred to as Patent Document). In conventional art, for this kind of the piston where a piston base body is made of aluminum alloy, in order to provide the disk-brake piston that secures thermal shock resistance and corrosion resistance, it was necessary to form an iron plating layer as groundwork of the chromium plating layer. In case that the iron plating layer is formed on the piston base body that is made of the aluminum alloy, a zinc immersion process needs to be conducted at twice for pretreatment removing oxide films on the surface of the piston base body completely. Accordingly, surface processes would be complicated.

As explained hereinabove, in the above prior art, production of the disk brake and the sliding member becomes bothersome. Accordingly, the present invention is made in light of the above problem, and it is an object of the present invention to provide a disk brake and a sliding member that can be easily produced.

SUMMARY OF THE INVENTION

The present invention has been made in light of the above problem, and it is an object of the present invention to provide a disk brake comprising: a piston that presses a brake pad to a disk rotor; and a caliper at which the piston is slidably provided through a piston seal, the caliper making the piston moved forward by hydraulic pressure, wherein the piston has a piston base body made of aluminum alloy, an anodized film layer formed by an anodized treatment on a surface of the piston base body, and a chromium plating layer directly laminated on a surface of the anodized film layer.

Further, according to a second aspect of the present invention, there is provided a disk brake comprising: a cup-shaped piston that presses a brake pad to a disk rotor; and a caliper at which an outer peripheral surface of the piston is slidably provided by abutting to an inner peripheral surface of a piston seal, the caliper making the piston moved forward by hydraulic pressure, wherein: the piston has a piston base body made of aluminum alloy, an anodized film layer formed by an anodized treatment on a surface of the piston base body, and a chromium plating layer directly laminated on a surface of the anodized film layer formed on an outer peripheral surface of the piston; the anodized film layer has a film thickness of 1.0 to 10.0 μm, and pores that are formed by the anodized treatment and have the length of 40 nm or more are distributed on the surface of the anodized film layer with density of 30 to 100 pieces/μm$^2$; and the chromium plating layer has surface roughness of 0.07 to 0.30 μmRa.

Still further, according to a third aspect of the present invention, there is provided a sliding member that is slidable within a cylinder, the sliding member having a base body made of aluminum alloy, an anodized film layer formed by an anodized treatment on a surface of the base body, and a chromium plating layer directly laminated on the surface of the anodized film layer.

BRIEF DESCRIPTION OF THE DRAWINGS

FIG. 5 is a diagram showing an anodizing-treatment condition and a chromium-plating condition according to an experiment 1;

FIG. 10 is a diagram showing an anodizing-treatment condition and a chromium plating condition according to an experiment 3;

FIG. 12 is a diagram showing the measuring result of the piston in diametral variations according to the experiment 3;

FIG. 13 is a diagram showing the measuring result of a sectional thickness of layer (the total thickness defined by the anodized film layer and the chromium plating layer) according to the experiment 3;

FIG. 14 is a diagram showing anodized treatment conditions and chromium plating conditions according to an experiment 4;

FIG. 15 is a view showing physical properties of the surface of an anodized film layer according to the experiment 4;

FIG. 16 is a diagram showing the result of the experiment 4;

FIG. 19 is the explanatory view of a method that measures admittance according to the experiment 5;

FIG. 20 is a diagram showing anodized treatment conditions and chromium plating conditions according to an experiment 6;

DETAILED DESCRIPTION OF THE PREFERRED EMBODIMENTS

Figure 1:
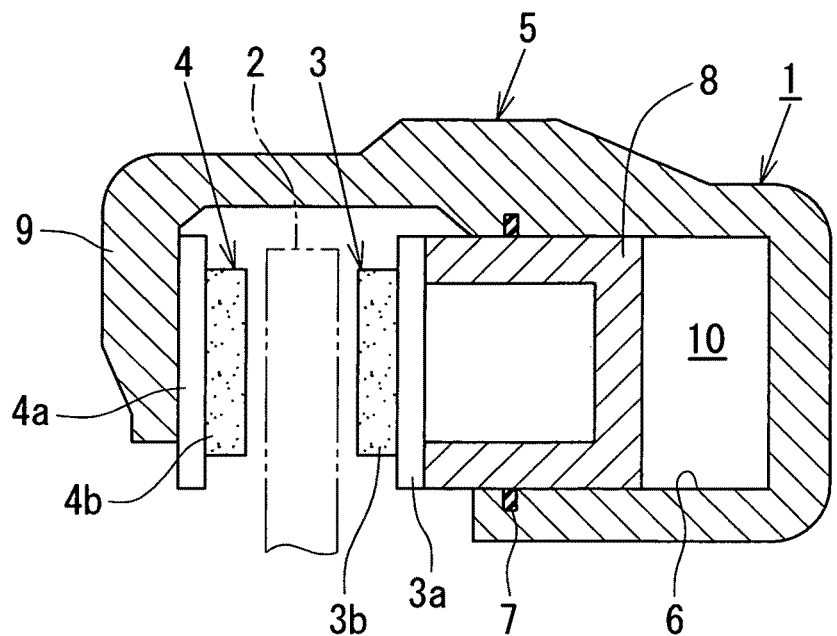
FIG. 1 is a sectional view showing the structure of a disk brake according to an embodiment of the present invention.

FIG. 1 shows the overall structure of a floating-caliper disk brake that would be suitable when applied to the present invention. As shown in FIG. 1, the disk brake comprises: a caliper 1; a disk rotor 2; a pair of brake pads 3, 4 that is arranged at each side of the disk rotor 2. By means of a carrier (not shown) fixed to the non-rotational portion of a vehicle, the caliper 1 and the brake pads 3, 4 are movably supported in the axial direction of the disk rotor 2 (in a horizontal direction in FIG. 1). The caliper 1 comprises: a cylinder body 5; and a cup-shaped piston 8 (a sliding member) that is slidably provided at a closed-end bore 6 provided at the base end portion of the cylinder body 5 through a piston seal 7. The piston 8 is arranged as that the opening end thereof be directed toward the brake pad 3 placed inside of the vehicle in a condition that the carrier supports the caliper 1 as shown in FIG. 1.

The top end portion of the cylinder body 5 is provided with a claw portion 9, the claw 9 being arranged as to face the brake pad 4 placed outside of the vehicle in a condition where the carrier supports the caliper 1. Here, the brake pads 3, 4 are composed of back plates 3a, 4a, and lining materials 3b, 4b attached to the back plates 3a, 4a. Further, a hydraulic pressure chamber 10 is formed between the bottom surface of the bore 6 of the cylinder body 5 and the non-opening end surface of the piston 8. When brake fluid is supplied to the hydraulic pressure chamber 10 with a brake pedal, the piston 8 is propelled so that the brake pad 3 placed inside of the vehicle is pressed to one surface of the disk rotor 2. Due to counterforce occurred in the above condition, the cylinder body 5 is shifted toward inside of the vehicle. Accordingly, by means of the claw portion 9, the brake pad 4 placed outside of the vehicle is pressed to the other surface of the disk rotor 2. By sandwiching the disk rotor 2 with the pair of brake pads 3, 4, the generation of braking force will occur.

Figure 2:
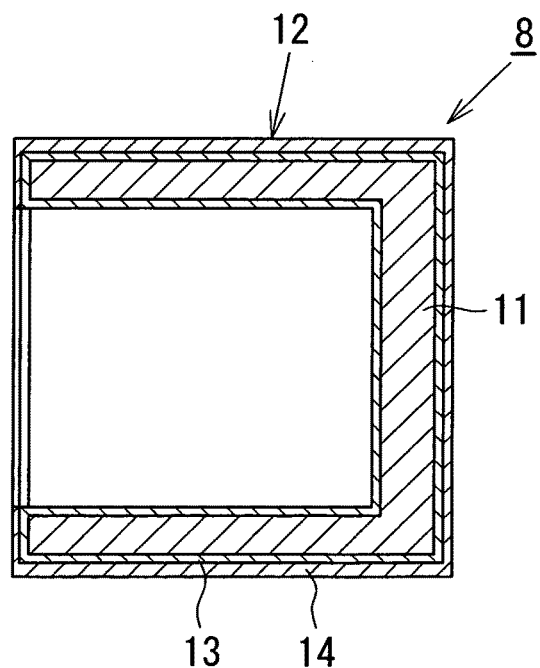
FIG. 2 is a sectional view showing the structure of a piston for a disk brake according to an embodiment of the present invention.

FIG. 2 shows a sectional view of the piston 8. As shown in FIG. 2, the piston 8 is fabricated as that a film 12 is formed on the surface of a piston base body 11 made of aluminum alloy. The film 12 is composed of: an anodized film layer 13 formed on the whole surface of the piston base body 11; and a chromium plating layer 14 laminating on the anodized film layer 13. The chromium plating layer 14 does not laminate all over the anodized film layer 13 but over the exterior of the piston base body 11, that is, an outer peripheral surface touching to the piston seal 7 and a surface to which brake fluid within the hydraulic pressure chamber 10 touches.

Figure 3:
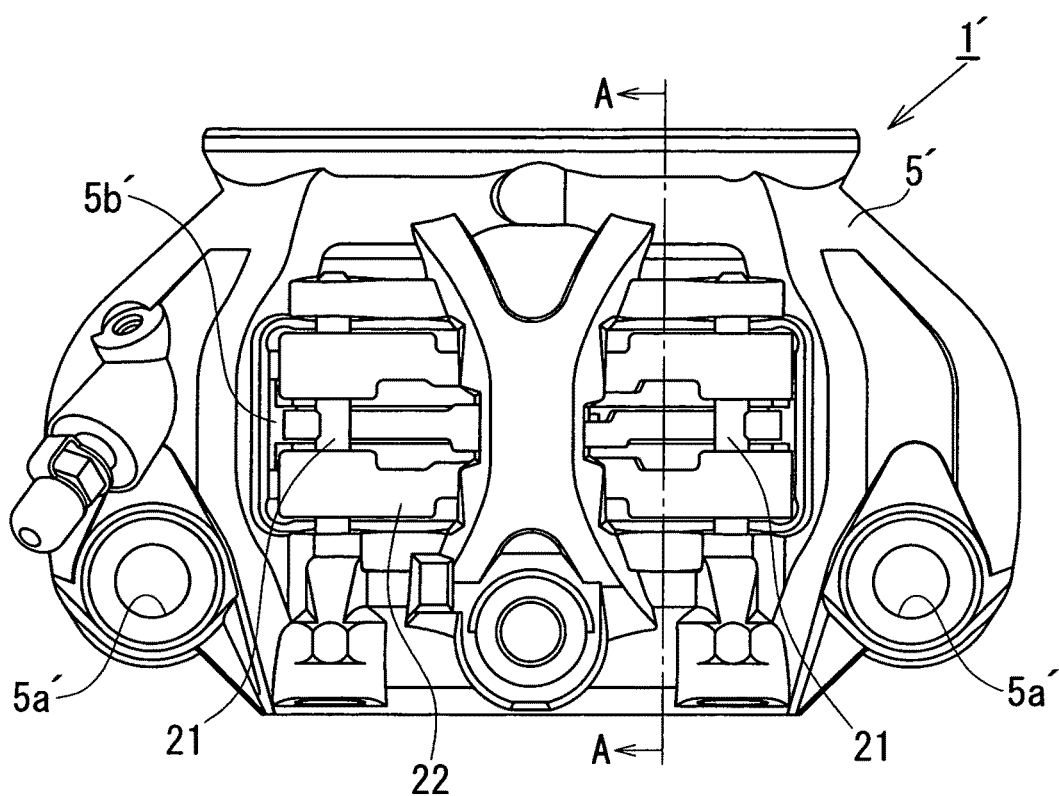
FIG. 3 is an outline view showing the outline of another disk brake according to an embodiment of the present invention.
Figure 4:
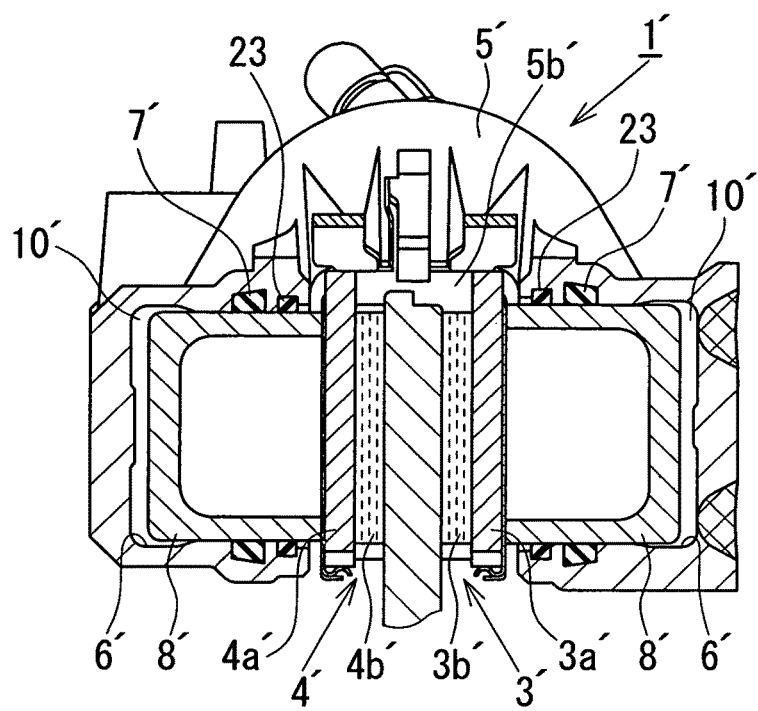
FIG. 4 is a sectional view showing still another structure of a disk brake according to an embodiment of the present invention.

Further, as shown in FIGS. 3 and 4, the piston 8 can be applied to a so-called an opposed-caliper disk brake. This opposed-caliper disk brake is composed of: a caliper 1'; a disk rotor 2'; and a pair of brake pads 3', 4' arranged at each side of the disk rotor 2'. In the caliper 1', each of fastening bolts (not shown) is inserted into a pair of fastening holes 5a' formed on the caliper main body 5'. By fixing the fastening bolts to the non-rotating portion of a vehicle, the caliper 1' is adapted to fix to the non-rotating portion of the vehicle.

The pair of the brake pads 3', 4' is arranged by being hung with pad pins 21, 21 within a space 5b' formed in the cylinder main body 5' along the rotational direction of the disk rotor 2'. Further, the brake pads 3', 4' are urged inside of the disk rotor 2' in its radial direction by means of a pad spring 22 that is fixed to the caliper main body 5'.

The cylinder body 5' is formed with at least a pair of closed-end bores 6', 6' that sandwiches the disk rotor 2'. The caliper 1' is composed of: a cylinder body 5'; and cup-shaped pistons 8', 8' (sliding member) that are slidably provided to the closed-end bores 6', 6' through piston seals 7', 7'. In the caliper 1' as shown in FIGS. 3 and 4, a facing 4 POD caliper, where the bores 6' and the piston 8' are 4 in total, is applied.

The piston seals 7' 7' are formed into annular bodies made of an ethylene-propylene rubber (EPDM) having a hardness of 70 to 85 IRHD, the section of the piston seals 7', 7' being square. Further, dust seals 23, 23 made of rubber are provided at the bore 6' where the dust seals 23, 23 are placed more opening side of the bore 6' than the piston seal 7'.

The piton 8', 8' are arranged as that their opening end portions are respectively directed toward the brake pads 3', 4'. At a space defined between the bottom surfaces of the bores 6', 6' of the cylinder body 5' and the non-opening end surfaces of the pitons 8', 8', hydraulic pressure chambers 10', 10' are formed, the space being closed by the piston seals 7', 7'. When brake fluid is supplied to the hydraulic pressure chambers 10', 10' by a brake pedal, the pistons 8', 8' are propelled so as to press the brake pads 3', 4' to each side of the disk rotor 2. Here, since the pair of brake pads 3, 4 presses the disk rotor 2, braking force toward the vehicle occurs.

The piston of the disk brake is adapted to move backward (or rollback) by a certain amount due to elasticity of the rubber piston seal following releasing of brake operation. On the other hand, the region of the piston that is fastened by the piston seal is adapted to shift according to abrasion of the brake pads. Based on this fact, the outer peripheral surface of the piston needs to, to some extent, closely contact to but be slidable relative to the piston seal. To satisfy these properties, the outer peripheral surface of the piston needs to be subjected to chromium plating.

Here, in case that the piston of the disk brake is an aluminium alloy base body, even if direct chromium plating to the aluminum alloy base body is attempted, the chromium plating can not effectually adhere to the aluminium alloy base body because the aluminium alloy base body reacts to oxygen in air so as to form a thin oxide film over the aluminium alloy base body. Accordingly, surface treatments prior to the chromium plating treatment need to be conducted. Based on the above, the present inventors conducted the chromium plating after iron plating with a good adherence to chrome has been supplied to the aluminium alloy base body. However, for conducting the iron plating, after degreasing the aluminum alloy base body, procedures such as etching treatments, desmut treatments, pretreatments for zinc immersion plating treatments and rust prevention treatments following the iron plating will be required thus making manufacture processes rather bothersome.

Accordingly, the present inventors have made a study of achieving the piton 8 (the sliding member) for a disk brake that can be simply produced while securing thermal shock resistance and corrosion resistance. Finally, the present inventors could achieve a conclusion that the following procedures would obtain the high-qualitative piston 8 for a disk brake that is superior to thermal resistance and corrosion resistance. That is, after the anodized film layer 13 having a thickness of 1.0 to 10.0 μm is formed on the whole surface of the piston base body 11 made of aluminium alloy by means of anodized treatments, the chromium plating layer 14 having a thickness of approximately 40 μm will be laminated on the whole outer peripheral surface of the piston base body 11 or at least on a region where the piston seal 7 is slidably moved.

Then, the chromium plating layer 14 formed on the outer peripheral surface of the piston 8 is subjected to finishing treatments so that the post-finish thickness of the chromium plating layer on the whole outer peripheral surface of the piston 8 or at least on a region where the piston seal 7 is slidably moved is set to 15 to 35 μm; its residual stress is set to −500 MPa or less; and its surface roughness is set to 0.07 to 0.30 μmRa. Hereinafter, experiments and the results thereby that are performed by the present inventors for achieving the present invention will be explained.

(Experiment 1) In an Experiment 1, anodized treatment conditions for obtaining good adherence will be selected. In the Experiment 1, piston material (Material: A6061) for a disk brake of a two-wheel vehicle is applied for the piston base body 11. 4 kinds of treatment fluids chosen are a sulfuric-acid solution, a phosphoric-acid solution, a chromic-acid solution, and an oxalic-acid solution, and the anodized treatment conditions and chromium plating conditions for each of the treatment fluids are shown in the diagram of FIG. 5. Here, for evaluating each of the treatment fluids, visual evaluations and adhesion evaluations through a Rockwell-hardness measuring device are taken. To be more specific, the adhesion evaluations are conducted by that: an indentation is formed on the outer peripheral surface of the piston 8 by means of the HRB scale of the Rockwell-hardness measuring device; a peeling test is then conducted by contacting a cellophane tape on the indentation; and lastly adhesiveness will be evaluated by means of a peeling degree of plating around the indentation.

According to the evaluation of the experiment 1, when the anodized treatment is conducted with the phosphoric-acid solution as shown in the diagram of FIG. 5, it is noted that a good adhesiveness is obtainable. Further, in case of the anodized treatment by the sulfuric-acid solution, the outer peripheral surface of the piston 8 lacks, based on the visual evaluations, brilliance in its appearance compared to the case of the anodized treatment by the phosphoric-acid solution. Peeling can be also found at each end side of the piston 8 in the sulfuric-acid solution. Furthermore, according to the peeling test based on the sulfuric-acid solution, the annular peelings of the plating can be found around the indentation. In addition, in case of the anodized treatment with the chromic-acid solution and the oxalic-acid solution, peelings were found in each of the solutions through the visual evaluations.

(Experiment 2) According to the result of the Experiment 1, the following can be found that the adhesiveness of the chromium plating is influenced by the properties of the anodized film layer 13 (porous layer) that is to be varied by the treatment solutions applied to the anodized treatment. Therefore, in an Experiment 2, the surface of a sample is subjected to the anodized treatment by each of the treatment solutions: the sulfuric-acid solution, the phosphoric-acid solution and chromic-acid so as to observe the surface of each of the samples through an optical microscope following the anodized treatment. Causal relation between the properties of the anodized film layer 13 and the adhesiveness of the chromium plating is then observed. Here, the sample applied in the Experiment 2 is a plate made of aluminium alloy (Material: A6061) having a thickness of 5 mm. See the diagram of FIG. 6 for the anodized treatment conditions based on each of the treatment solutions.

Figures 6, 7:
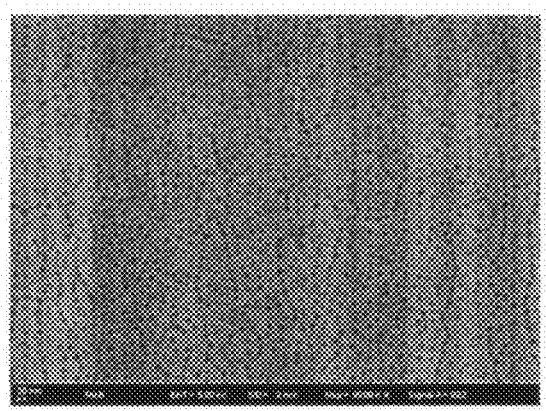
FIG. 6 is a diagram showing an anodizing-treatment condition according to an experiment 2.
FIG. 7 is an image of the surface of an anodized-film layer of the experiment 2 by an optical microscope, especially focusing on a surface image where a sulfuric-acid solution is applied as anodized processing liquid.
Figure 8:
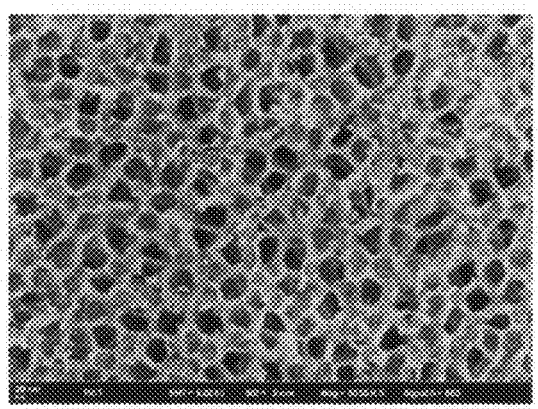
FIG. 8 is an image of the surface of the anodized-film layer of the experiment 2 by the optical microscope, especially focusing on a surface image where a phosphoric-acid solution is applied as anodized processing liquid.
Figure 9:
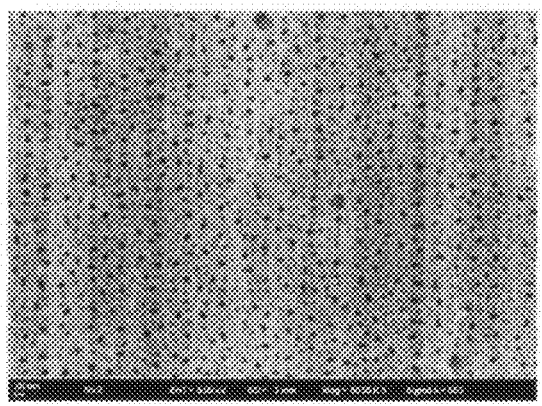
FIG. 9 is an image of the surface of the anodized-film layer of the experiment 2 by the optical microscope, especially focusing on a surface image where a chromic-acid solution is applied as anodized processing liquid.

The results based on the Experiment 2 shown in FIG. 6 are considered with reference to FIGS. 7 to 9. As shown in FIG. 8, it can be said that the anodized film layer 13 obtained by the anodized treatment based on the phosphoric-acid solution is formed with pores (holes) on its surface, notably large sizes (diameters) of the pores compared to the pores formed on the anodized film layer 13 by the anodized treatment based on the other treatment solutions as shown in FIGS. 7 and 9. To be more specific, the diameter of the pores formed on the surface of the anodized film layer 13 obtained by the anodized treatment based on the sulfuric-acid solution as shown in FIG. 7 is approximately 10 nm while the diameter of the pores formed on the surface of the anodized film layer 13 obtained by the anodized treatment based on the chromic-acid solution as shown in FIG. 9 is approximately 20 nm. On the contrary, the diameter of the pores formed on the surface of the anodized film layer 13 obtained by the anodized treatment based on the phosphoric-acid solution as shown in FIG. 8 is 40 to 60 nm. Accordingly, based on the Experiment 1 where the anodized film layer 13 obtained by the anodized treatment based on the phosphoric-acid solution is applied as a base, the following theory can be established that the adhesiveness of the chromium plating depends on the diameter of the pores.

(Experiment 3) In an Experiment 3, under conditions as shown in FIG. 10, a sample (the piston 8) where chromium plating is laminated on the anodized film layer 13 (porous layer) obtained by the anodized treatment based on the phosphoric-acid solution is applied. Basic data based on anodized treatment time that is varied at three stages of 5 minutes, 10 minutes and 20 minutes will be obtained. Further, through an evaluation test as regards thermal shock resistance and corrosion resistance, the piston 8 for the disk brake is then validated. In the Experiment 3, piston material (Material: A6061) having its major diameter of 30 mm is applied as the piston base body 11. Here, evaluation based on the above test is, in addition to the visual observations, performed by 3 items, that is, diametral variation quantities, sectional film thickness, and thermal shock resistance as well as corrosion resistance.

Figure 11:
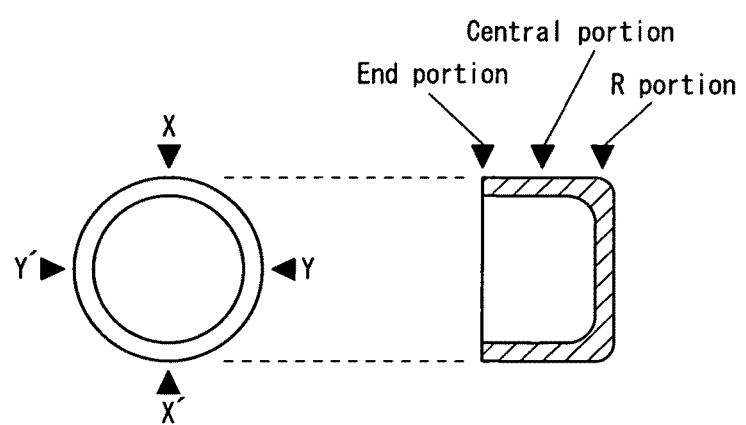
FIG. 11 is an explanatory view showing the measuring regions of a piston according to the experiment 3.

The diametral variation quantities will be obtained as that diameters with variable sizes prior to and posterior to the chromium plating (the diameter prior to the chromium plating is the diameter of the material) are measured at two times in two directions taken along lines X-X' and Y-Y'. A sectional thickness will be obtained as that a film thickness at 3 positions defined by an R portion, a central portion and an end portion as shown in FIG. 11 will be measured at 4 places defined by X, X', Y and Y'. The evaluation test of thermal shock resistance and the corrosion resistance will be performed as follows. The thermal shock resistance, that is, the sample has been kept at 300° C. for 30 minutes and suddenly cooled off by water, is repeated by 5 cycles. Then, a combined cyclic corrosion test by means of JASO M601 is repeated by 50 cycles in order to identify whether corrosion or blister exists on the external surface of the sample. Here, in the Experiment 3, the surface of the sample applied with the chromium plating is subjected to polishing finish. The condition of the polishing finish will be satisfied by a buffing-wheel grain size of #240, a rotation speed of 1300 rpm, an indentation pressure of 0.5 MPa, and polishing time of 5 seconds repeated by 5 times.

Through the visual evaluations following the above experiment, in each of the samples (the piston 8), there was no serious corrosion found, so that performance of the piston 8 for the disk brake was well secured. Further, based on the measuring result of the diametral variation quantities of the piston 8 as shown in FIG. 12 as well as the measuring result of the sectional film thickness as shown in FIG. 13, it was found that the longer time the sample is in the anodized treatment, the smaller the external diameter of the sample becomes and the larger the sectional film thickness becomes following the chromium plating. In each of the conditions, as shown in the diagram of FIG. 10, since the treatment time for the chromium plating is 30 minutes that is the same for every condition, it can be assumed that the difference of the diametral variation quantities and the sectional film thickness is due to time for the anodized treatment.

(Experiment 4) In an Experiment 4, causal relation between physical properties of the surface of the anodized film layer 13 and adhesiveness of the chromium plating will be considered. Here, anodized treatment conditions and chromium plating treatment conditions are as indicated in the diagram of FIG. 14. In the Experiment 4, in order to identify the physical properties of the surface of the anodized film layer 13, the diameter of pores, (nm), the wall thickness of pores (nm) and density of pores (pieces/$\mu m^2$) will be observed. See FIG. 15. Here, a plate made of aluminum alloy having thickness of 5 mm (Material: A6061) is applied as a sample in the Experiment 4.

With reference to FIG. 16, it can be noted that the physical properties of the anodized film layer 13 that are treated by a bath temperature of 20 to 50° C. where good adhesiveness of the chromium plating is obtainable are defied as that the film thickness of the anodized film layer 13 is 1.0 to 10.0 μm, and the pores having the diameter of 40 nm or more are distributed on the surface of the anodized film layer 13 with density of 30 to 100 pieces/$\mu m^2$. Here, the film thickness of the anodized film layer 13 obtained by the anodized treatment based on the phosphoric-acid solution will be approximately 1.0 to 10.0 μm. It is noted that the physical properties of the surface of the anodized film layer 13 where good adhesiveness of the chromium plating is obtainable include that the diameter of the pores on the surface is 240 nm or less. Further, as shown in FIG. 16, it is also noted that the physical properties of the surface of the anodized film layer 13 where good adhesiveness of the chromium plating is obtainable include that the wall thickness of the pores (thickness of wall between pores) can be defined as 10 to 110 nm. Here, the diameter of the pores does not necessarily become circular, so that the maximum length of the opening portion of the pores is altogether denoted as a diameter. In addition, as to the measurement of the wall thickness of the pores, it is preferable that approximately 80% of the wall thickness is within the range of 10 to 110 nm by the gross.

(Experiment 5) In consideration of the Experiment 4, in case that the chromium plating is laminated on the anodized film layer (porous layer) 13 obtained by the anodized treatment based on the phosphoric-acid solution, it was found that there is causal relation between the physical properties of the surface of the anodized film layer 13 and the adhesiveness of the chromium plating. Accordingly, the present inventors consider that, since admittance of the anodized film layer 13 will be varied in accordance with the physical properties of the surface of the anodized film layer 13, that is, the diameter of the pores, the wall thickness of the pores, the density of the pores, and the film thickness of the pores, the admittance would be considered as a main parameter to understand the physical properties of the anodized film layer 13 in general.

Figures 17, 18:
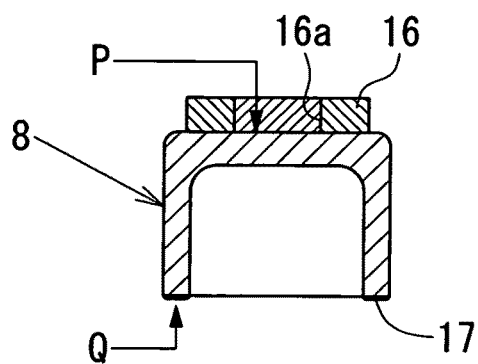
FIG. 17 is a diagram showing anodized treatment conditions and chromium plating conditions according to an experiment 5.
FIG. 18 is a diagram showing the result of the experiment 5.

In the Experiment 5, causal relation between the admittance of the anodized film layer 13 and adhesiveness of the chromium plating will be considered in case that a sample (the piston 8) laminated by the chromium plating is applied on the anodized film layer 13 obtained by the anodized treatment based on the phosphoric-acid solution. Here, measurement of the admittance of the anodized film layer 13 will be performed pursuant to JIS H8683-3:1999. Further, in the Experiment 5, as shown in FIG. 17, a ring-shaped cell 16 will be set to a non-opening end surface 15 of the sample (piston 8), and a hollow portion 16*a* of the cell 16 is filled with electrolyte (potassium sulfate solution). Further, the opening end surface 17 of the sample (the piston 8) is ground so as to expose its base material, and the admittance defined between P and Q as shown in FIG. 17 is measured at frequency of 1 kHz. Here, piston material (Material: A6061) having the external diameter of 30 mm is applied as the sample in the Experiment 5. Further, anodized treatment conditions are as shown in the diagram of FIG. 18.

FIG. 19 is a diagram that indicates a measuring result of admittance in case that density of the phosphoric acid and bath temperature are different from each other. Having considered the result of the Experiment 4 with reference to the FIG. 19 diagram, in case that the anodized film layer 13 is formed on the surface of the piston base body 11 made of aluminum alloy by means of anodized treatment based on the phosphoric-acid solution, and the chromium plating layer 14 is formed on the anodized film layer 13, it is noted that preferable admittance of the anodized film layer 13 where good adhesiveness of the chromium plating is obtainable will be 0.89 to 2.00 mS. Accordingly, based on the result of the Experiment 5, the present inventors determine preferable admittance of the anodized film layer 13 that can obtain good adhesiveness of the chromium plating when the anodized film layer 13 is formed by the anodized treatment based on the phosphoric-acid solution is 0.9 to 2.0 mS. Here, in the Experiment 5, the admittance is measured under a condition that only the anodized film layer 13 is formed; however, under a condition that the chromium plating layer 14 is laminated on the surface of the anodized film layer 13, the chromium plating layer 14 is hardly laminated on the inner surface side of the piston 8. Accordingly, it is possible to measure the admittance on the inner surface side of the piston 8 instead of the non-opening end surface 15.

Figure 21:
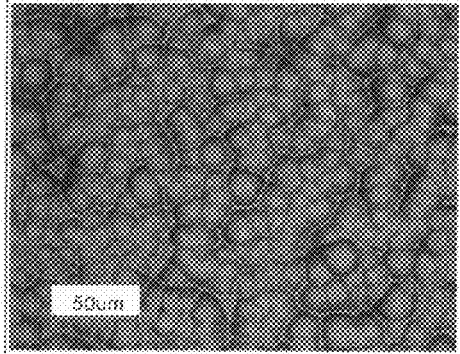
FIG. 21 is a diagram showing finishing conditions, and images of piton surfaces by an optical microscope that are compared between before and after finishing, according to an experiment 7.

(Experiment 6) In an experiment 6, the surface of a sample (piston 8) where chromium plating is laminated on the anodized film layer 13 (porous layer) obtained by anodized treatment based on the phosphoric-acid solution is finished, and thermal shock resistance and corrosion resistance based on the physical properties of the finished surface are evaluated. Piston material (Material: A6061) having the external diameter of 30 mm is applied as the piston base body 11 (a sample) in the Experiment 6. Here, anodized treatment conditions and chromium plating conditions are as shown in the diagram of FIG. 20. The finishing conditions of the surface (the chromium plating layer 14) of the sample (the piston 8) are as shown in the diagram of FIG. 21. Here, the surface is finished by means of grinding (buffing) after the external-diameter measurement of the sample (piston 8) has been adjusted by a centerless grinder.

As shown in FIG. 21, based on the appearance and the surface roughness, it is noted that the surface of the sample of the Experiment 6 posterior to finishing becomes smoother than the surface prior to finishing. Further, according to the measuring result by an X-ray stress measuring method, the residual stress of the surface of the sample has been changed from the residual stress (tensile stress) 127 MPa of the surface prior to finishing to a compressive stress of −689 Mpa. Accordingly, in the sample of the Experiment 6 where the chromium plating layer 14 laminated on the surface of the sample is finished based on the above conditions, even if a thermal shock test where the sample has been kept at 300° C. for 30 minutes and suddenly cooled off by water is repeated by 5 cycles, there is not found any blister or peeling on the surface, so that adhesiveness remains in a good condition. Further, a combined cyclic corrosion test based on JASO M610 is performed by 50 cycles, and corrosion resistance is evaluated based on the test. As a result, the rate of a corrosion area following 10 cycles becomes a rating 9 or more, and corrosion resistance is in a good condition. Here, the measuring of the residual stress as discussed above is performed based on an "X-ray stress measuring method" written on "Non Destructive Testing" by the Japanese Society for Non-Destructive Inspection, Vol. 37, No. 8, p. 636 to 642. Besides the above method, the residual stress is measurable by a strain gauge method, an X-ray diffraction analysis, Barkhausen analysis, etc.

(Experiment 7) In an Experiment 7, as the comparative example of the Experiment 6, thermal shock resistance and corrosion resistance will be evaluated in case that finish conditions of the surface (the chromium plating layer 14) of the sample (the piston 8) are different. Specifically, in the Experiment 6, the external diameter of the sample (the piston 8) is adjusted by means of the centerless grinder, and the surface of the sample is finished with grinding (buffing). On the other hand, in the evaluation of the Experiment 7, the surface of the sample is finished only with grinding but not with the adjustment of the external diameter of the sample by the centerless grinder. Here, conditions for finishing the surface of the sample are as shown in the diagram of FIG. 22, and the other conditions (anodized treatment, chromium plating, etc.) are as the same with the Experiment 6 for comparison (see the diagram of FIG. 20).

Figure 22:
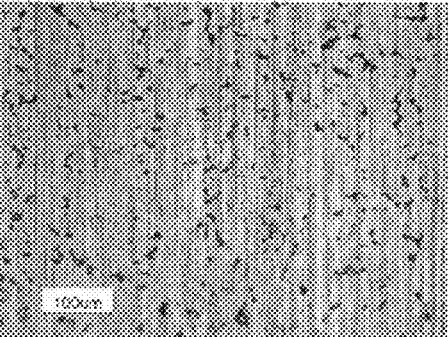
FIG. 22 is a diagram showing finishing conditions, and images of piton surfaces by an optical microscope that are compared between before and after finishing according to an experiment 8.

With reference to FIG. 22, in case that the grinding by the grinder is not performed, that is, the external diameter of the sample is not adjusted, it is noted that, in the comparative sample of the Experiment 7, the convexoconcave surface of the sample is not smoothed enough through observation of its appearance and surface roughness. The surface roughness of the comparative sample of the Experiment 7 is found to be rougher than the surface roughness of the sample of the Experiment 6. Here, the residual stress of the surface (the chromium plating layer 14) of the comparative sample of the Experiment 7 posterior to the finishing was −361 MPa. In comparison with the Experiment 6 where the residual stress of the surface of the sample is −689 MPa, the compressive stress of the Experiment 7 was reduced as a result. Based on the above, a thermal shock test (the sample has been kept at 300° C. for 30 minutes and suddenly cooled off by water, and repeated by 5 cycles) is conducted, and a combined cyclic corrosion test by JASO M610 has been then repeated by 50 cycles. As a result, the rate of corrosion areas following 10 cycles is a rating No. 8 and less, so that it is noted that there is a problem in corrosion resistance. This is assumed that the convexoconcave surface of the comparative sample of the Experiment 7 is not smoothed enough, whereby the aluminium alloy placed on the ground of the sample decays through channel cracking existing at the concave portions of the sample surface following the chromium plating.

Based on the results of the Experiments 6 and 7, the present inventors determine that preferable conditions that enable to secure thermal shock resistance and corrosion resistance in case that the anodized film layer 13 (porous layer) by the anodized treatments based on the phosphoric-acid solution is formed on the surface of the piston base body 11 made of aluminium alloy, and the chromium plating layer 14 is formed on the anodized film layer 13 will be that the residual stress of the surface following finishing (grinding or polishing) is −500 MPa or less (that is, further expanding compressive stress). In addition, the surface roughness of the sample is measured by a stylus-type surface roughness measuring device indicated in JIS B 0651-2001, and set to 0.06 to 0.34 μmRa, or more preferably, to 0.07 to 0.30 μmRa. Here, in case that the surface roughness of the external surface of the piston 8 is 0.05 μmRa or less, the piston 8 slides relative to the piston seal 7 when brake is released. Accordingly, the brake pads 3, 4 are not successfully, separated from the disk rotor 2 whereby a so-called drag of the brake pads will become excessive causing negative influence to fuel consumption of the vehicle. On the other hand, in case that the surface roughness of the external surface of the piston 11 is 0.35 μmRa or more, the rollback of the piston 8 due to the piston seal 7 becomes excessive when brake is released, so that more amounts of fluid will be required when next braking is performed causing negative influences to brake feeling. Here, it is not always necessary to set the residual stress to be −500 MPa or less. As long as the thermal shock resistance and the corrosion resistance of the piston of the disk brake are in a tolerance range, required conditions will be only that compressive stress is at least applied to the chromium plating layer.

Figure 23:
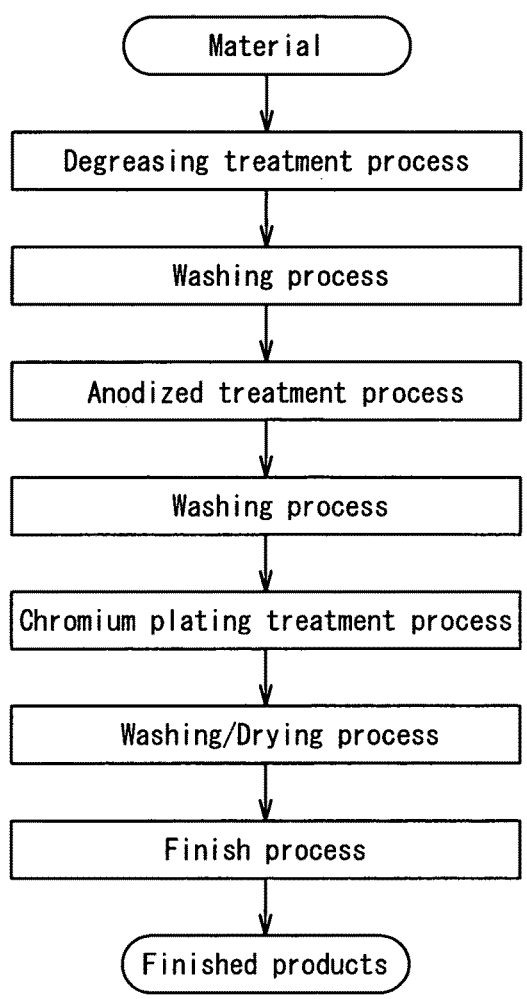
FIG. 23 is an explanatory view showing surface finishing processes based on an embodiment 1.

With reference to FIG. 23, processes that treat the surface of the cup-shaped piston base body 11 will be hereinbelow explained. Here, piston material (Material: A6061) is applied for the piston base body 11. First, the surface of the piston base body 11 is degreased through a degreasing process. Next, the piston base body 11 that has completed the degreasing process is washed by water through a washing/drying process. Then, the anodized film layer 13 will be formed on the whole surface of the piston base body 11 through the anodized treatment based on the phosphoric-acid solution. Anodized treatment conditions in the anodized treatment process are as shown in the diagram of FIG. 20.

With the anodized treatment under the above conditions, the anodized film layer 13 can obtain physical properties of the following: the film thickness (the thickness of the layer) is set to 1.0 to 10.0 μm; the pore diameter is set to 40 to 240 nm; the wall thickness of the pore (the wall thickness defined between the pores) is set to 10 to 110 nm, the density of the pore is set to 30 to 100 pieces/μm$^2$, and the admittance is 0.9 to 2.0 mS. The piston base body 11 with the surface on which the anodized film layer 13 having such physical properties is formed can obtain good adhesiveness of the chromium plating in a later-explained chromium plating treatment process. Here, the piston base body 11 that has completed the anodized treatment will be washed by water through the washing process.

Next, in the chromium plating treatment process, the chromium plating layer 14 is laminated over the surface of the piston base body 11 on which the anodized film layer 13 is formed. Here, chromium plating treatment conditions in the chromium plating treatment process is as shown in the diagram of FIG. 20. As shown in FIG. 2, the chromium plating layer 14 is formed only on the surface appearance of the piston 8. The piston base body 11 that has completed the chromium plating treatment is first washed by water and then dried through the washing/drying process. In the piston 8 where the chromium plating layer 14 is laminated on the anodized film layer 13, the outer periphery of the piston 8 (the periphery to which the piston seal 7 is attached) is finished in a finish process.

In the finish process, the external diameter of the piston 8 is first adjusted by the centerless grinder, and then the surface of the piston 8 is finished by grinding (buffing). Here, finish conditions of the surface of the piston 8 is as shown in the diagram of FIG. 21. Through the finish process, as regards the chromium plating layer 14 formed on the outer periphery of the piston 8, channel cracking and fine convexoconcave formation formed on the surface of the chromium plating layer 14 are closed and removed respectively. Going through these processes, it is possible to obtain the piston 8 where the residual stress of the chromium plating layer 14 formed on the outer periphery thereof is −500 MPa and less, and the surface roughness thereof is 0.07 to 0.30 μmRa. The piston 8 obtaining such physical properties is able to secure the thermal shock resistance and corrosion resistance suitable for disk brakes.

In the above embodiments discussed hereinabove, the following effects are obtainable. In the embodiments, the anodized film layer 13 is formed on the surface of the piston base body 11 made of aluminum alloy by the anodized treatment based on the phosphoric-acid solution, and the chromium plating layer 14 is then formed on the anodized film layer 13. Here, through the formation, the physical properties of the anodized film layer 13 obtained by the anodized treatment are set as follows: the film thickness (the thickness of the layer) is set to 1.0 to 10.0 μm; the pore diameter is set to 40 to 240 nm; the wall thickness of the pore (the thickness of the wall defined between the pores) is set to 10 to 110 nm; the pore density is set to 30 to 100 pieces/μm$^2$, and the admittance is set to 0.9 to 2.0 mS. Accordingly, good adhesiveness of the chromium plating can be obtained through the chromium plating process.

Further, in the above embodiments, after the chromium plating layer 14 is formed on the anodized film layer 13 by the chromium plating treatment, the outer periphery of the piston 8 is finished by grinding and polishing so that: the residual stress of the chromium plating layer 14 formed on the outer periphery of the piston 8 is −500 MPa and less, and the surface roughness of the piston 8 is 0.07 to 0.03 μmRa. Accordingly, adhesiveness of the chromium plating layer 14 is secured, so that it becomes possible to provide the piston 8 with good thermal shock resistance and corrosion resistance that is suitable for disk brakes. Still further, conventionally, in order to secure the adhesiveness of the chromium plating layer, it was necessary to form an iron plating layer as the ground of the chromium plating layer. Based on conventional methods, it was thus necessary to add a process to conduct a zinc immersion treatment thereby not only complicating the process but also increasing the production cost of the piston 8. However, in the present embodiment, the zinc immersion treatment is not necessary thereby consequentially being able to reduce complication of the processes and increase of the manufacturing cost.

Here, in the above embodiment, as one example of the sliding member, the piston of the disk brake is exemplified; however, as long as it is a sliding member made of aluminum alloy that slidably moves in a cylinder, for example, the piston of a master cylinder, the piston rod of a hydraulic draft gear, the valve body of a controlling valve device installed in a brake system, etc. can be applied as the sliding member.

In the above embodiments, the disk brake comprises: the piston that presses the brake pad to the disk rotor; and the caliper where the piston is slidably provided through the piston seal, and the piston moves forward by hydraulic pressure. Further, the piston is formed as that the anodized film layer formed by the anodized treatment is formed on the surface of the piston base body made of aluminium alloy, and then the chromium plating layer is directly laminated on the surface of the anodized film layer. With this structure, it is possible to reduce the production processes of the disk brake, and to secure thermal shock resistance and corrosion resistance of the piston of the disk brake.

In the above embodiments, the anodized film layer is formed as that its film thickness is 1.0 to 10.0 μm, and the pores having the diameter of 40 nm or more that are formed by the anodized treatment are distributed on its surface with the density of 30 to 100 pieces/μm$^2$. With this structure, adhesiveness of the chromium plating layer to the piston base body becomes more suitable, so that the thermal shock resistance and corrosion resistance of the piston of the disk brake can be well obtained.

In the above embodiments, the anodized film layer contains the pores with the diameter of 240 nm or less. With this structure, adhesiveness of the chromium plating layer to the piston base body becomes more suitable, so that the thermal shock resistance and corrosion resistance of the piston of the disk brake can be well obtained.

In the above embodiments, the anodized film layer includes the pores where each of the pores has a space of 10 to 110 μm therebetween. With this structure, adhesiveness of the chromium plating layer to the piston base body becomes more suitable, so that the thermal shock resistance and corrosion resistance of the piston of the disk brake can be well obtained.

In the above embodiments, the anodized film layer has the admittance value of 0.9 to 2.0 mS. With this structure, the adhesiveness of the chromium plating layer to the piston base body becomes more suitable, so that the thermal shock resistance and corrosion resistance of the piston of the disk brake can be well obtained. Further, by measuring the admittance value of the anodized film layer when manufactured, it is possible to secure quality of the piston through an easy testing.

In the above embodiments, as regards the piston, the chromium plating layer forming on the outer periphery thereof is grinded, so that the residual stress of the chromium plating layer posterior to the grinding is set to −500 MPa and less. With this structure, the thermal shock resistance and corrosion resistance of the piston of the disk brake become obtainable. Here, it is not necessarily set the residual stress to be −500 MPa or less. Instead, as long as it is in a range where thermal shock resistance and corrosion resistance are allowable for the piston of the disk brake, compressive stress needs to be at least applied to the chromium plating layer.

In the above embodiments, considering the piston, the chromium plating layer forming on the outer periphery thereof is grinded, so that the surface roughness of the chromium plating layer posterior to the grinding is set to 0.07 to 0.30 μmRa. With this structure, it is possible to reduce negative influence given to fuel consumption and brake feeling of the vehicle.

In the above embodiments, the sliding member that slidably moves within the cylinder is formed as that the anodized film layer formed by the anodized treatment is formed on the surface of the piston base body made of aluminum alloy, and then the chromium plating layer is directly laminated on the surface of the anodized film layer. With this structure, it is possible to reduce the manufacturing process of the sliding member.

In the above embodiments, the anodized film layer is formed as that its film thickness is 1.0 to 10.0 μm, and the pores having the diameter of 40 nm or more that are formed by the anodized treatment are distributed on its surface with density of 30 to 100 pieces/μm$^2$. With this structure, adhesiveness of the chromium plating layer to the a sliding member base body becomes more suitable, so that the thermal shock resistance and corrosion resistance of the sliding member can be well obtained.

In the above embodiments, the anodized film layer is formed as that the admittance value thereof is 0.9 to 2.0 mS. With this structure, adhesiveness of the chromium plating layer to the sliding member base body becomes more suitable, so that the thermal shock resistance and corrosion resistance of the sliding member can be well obtained. Further, by measuring the admittance value of the anodized film layer when produced, it will be possible to secure quality of the sliding member with easy testing.

What is claimed is:

1. A disk brake comprising:
   a piston that presses a brake pad to a disk rotor; and
   a caliper at which the piston is slidably provided through a piston seal, the caliper making the piston moved forward by hydraulic pressure,
   wherein the piston has a piston base body made of aluminum alloy, an anodized film layer formed by an anodized treatment on a surface of the piston base body, and a chromium plating layer directly laminated on a surface of the anodized film layer, and
   wherein the anodized film layer has a thickness in a range of 1.0 and 10.0 μm, pores with a diameter of 40 nm or more which are formed by the anodized treatment are distributed on the surface of the anodized film layer with a density of 30 to 100 pores/μm$^2$, and the chromium plating layer has a film thickness of 15 μm or more.

2. The disk brake according to claim 1, wherein the pores formed on the anodized film layer have a space of 10 to 110 μm therebetween.

3. The disk brake according to claim 1, wherein the pores formed on the anodized film layer have a diameter of 240 nm or less.

4. The disk brake according to claim 3, wherein the pores formed on the anodized film layer have a space of 10 to 110 μm therebetween.

5. The disk brake according to claim 1, wherein the anodized film layer has admittance value of 0.9 to 2.0 mS.

6. The disk brake according to claim 1 wherein the chromium plating layer is formed on an outer peripheral surface of the piston where at least the piston seal is slidably moved.

7. The disk brake according to claim 1 wherein the chromium plating layer has a film thickness of 35 μm or less.

8. The disk brake according to claim 1 wherein the piston is formed as that the chromium plating layer formed on the outer peripheral surface of the piston is grinded, and residual stress of the chromium plating layer posterior to the grinding is −500 MPa or less.

9. The disk brake according to claim 1 wherein the piston is formed as that the chromium plating layer formed on the outer peripheral surface of the piston is grinded, and surface roughness of the chromium plating layer posterior to the grinding is 0.07 to 0.30 Ra.

10. A disk brake comprising:
    a cup-shaped piston that presses a brake pad to a disk rotor; and
    a caliper at which an outer peripheral surface of the piston is slidably provided by abutting to an inner peripheral surface of a piston seal, the caliper making the piston moved forward by hydraulic pressure, wherein:
    the piston has a piston base body made of aluminum alloy, an anodized film layer formed by an anodized treatment on a surface of the piston base body, and a chromium plating layer directly laminated on a surface of the anodized film layer formed on an outer peripheral surface of the piston;
    the anodized film layer has a film thickness of 1.0 to 10.0 μm, and pores with a length of 40 nm or more which are formed by the anodized treatment are distributed on a surface of the anodized film layer with density of 30 to 100 pores/μm$^2$; and
    the chromium plating layer has a film thickness of 15 to 35 μm and the chromium plating layer has a surface roughness of 0.07 to 0.30 Ra.

11. The disk brake according to claim 10, wherein the pores formed on the anodized film layer have a diameter of 240 nm or less.

12. The disk brake according to claim 10, wherein the pores formed on the anodized film layer have a space of 10 to 110 μm therebetween.

13. The disk brake according to claim 10 wherein the chromium plating layer is formed on a portion along which at least the piston seal is slidably moved.

14. The disk brake according to claim 10, wherein, among the anodized film layer, admittance value on an inner surface side of the piston is 0.9 to 2.0 mS.

15. The disk brake according to claim 10 wherein the piston is formed as that the chromium plating layer formed on the outer peripheral surface of the piston is grinded, and residual stress of the chromium plating layer posterior to the grinding is −500 MPa or less.

16. A sliding member that is slidable within a cylinder, the sliding member having a base body made of aluminum alloy, an anodized film layer formed by an anodized treatment on a surface of the base body, and a chromium plating layer directly laminated on the surface of the anodized film layer,
    wherein the anodized film layer has a thickness in a range of 1.0 and 10.0 μm, pores with a diameter of 40 nm or more which are formed by the anodized treatment are distributed on the surface of the anodized film layer with a density of 30 to 100 pores/μm$^2$, and the chromium plating layer has a film thickness of 15 μm or more.

17. The sliding member according to claim 16, wherein the anodized film layer has admittance value of 0.9 to 2.0 mS.

18. The sliding member according to claim 16, wherein the chromium plating layer has a film thickness of 35 μm or less.

19. The sliding member according to claim 16, wherein the pores formed on the anodized film layer have a space of 10 to 110 μm therebetween, the pores having a diameter of 240 nm or less.

* * * * *